(No Model.)
E. SPENCER.
Machine for Gathering and Loading Hay.
No. 239,069. Patented March 22, 1881.
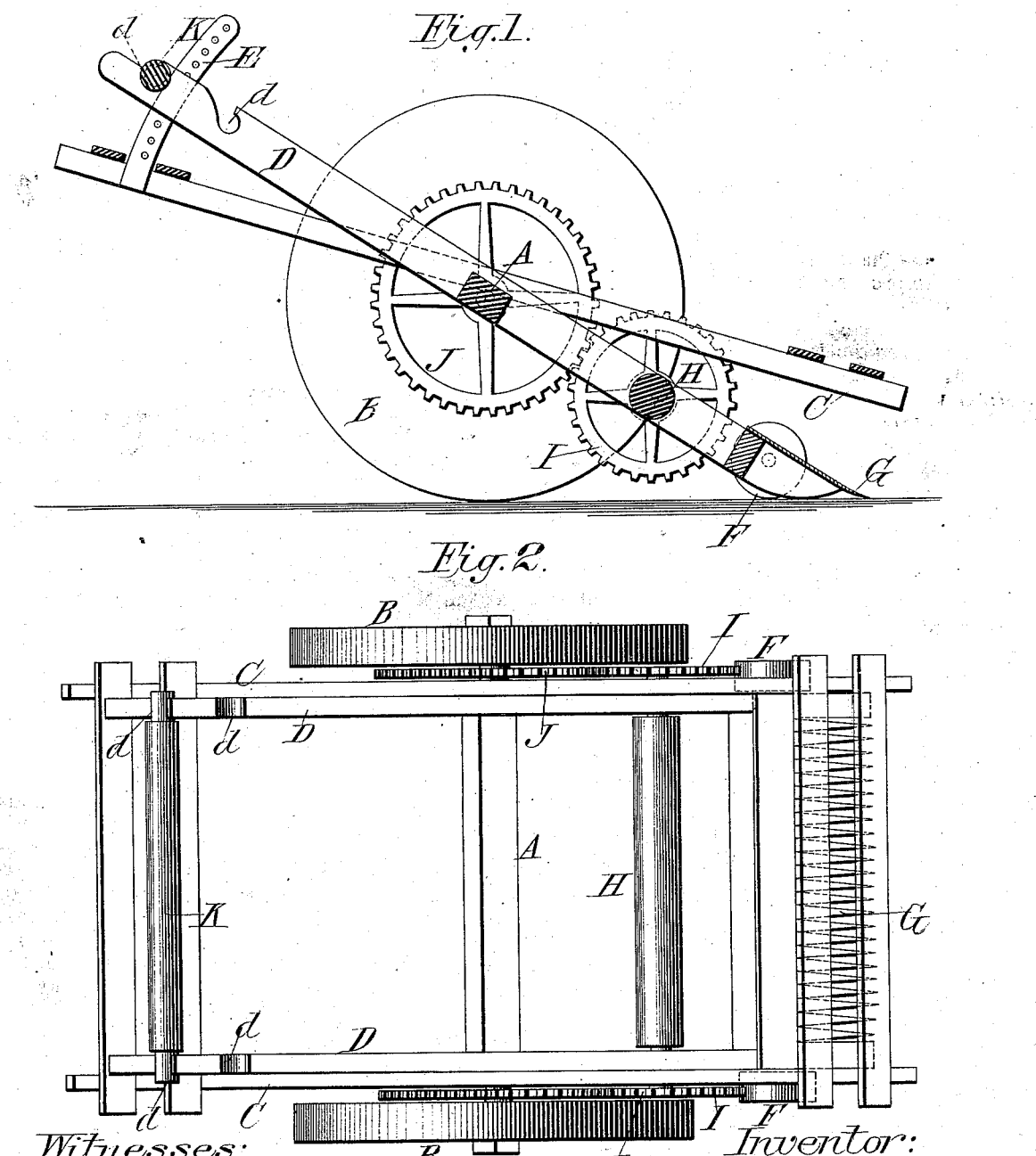
Witnesses:
Hugh E. Miller
J. P. [illegible]
Inventor:
Edwin Spencer

UNITED STATES PATENT OFFICE.

EDWIN SPENCER, OF OCALA, FLORIDA.

MACHINE FOR GATHERING AND LOADING HAY.

SPECIFICATION forming part of Letters Patent No. 239,069, dated March 22, 1881.

Application filed November 8, 1880. (No model.)

*To all whom it may concern:*

Be it known that I, EDWIN SPENCER, of Ocala, in the county of Marion and State of Florida, have invented certain new and useful Improvements in Hay Rakers and Loaders; and I do hereby declare the following to be a full, clear, and exact description of the same, reference being made to the accompanying drawings, forming a part of this specification, and in which—

Figure 1 represents a longitudinal vertical section of my invention; Fig. 2, a plan view.

My invention relates to certain new and useful improvements in the class of machines especially designed for gathering and loading hay; and the invention consists in a novel construction, combination, and arrangement of parts, all as will be hereinafter fully described, and specifically pointed out in the claim.

In the drawings, A represents a transverse shaft having loosely mounted on the ends thereof the ground or supporting wheels B B.

C represents a rectangular frame centrally mounted on said shaft A, and having arranged inside thereof a similar frame, D, loosely mounted on the same shaft A. These frames C D are adjustably connected together at their inner and upper ends by a segmental perforated bar or bars, E, rigidly connected to the frame C and to the frame D by a pin or pins passing through the perforations in said bar E into a suitable hole formed through the side bar or bars of the frame D.

Near the lower end of the frame D are journaled small wheels F F, for supporting said end of the frame above the ground, and which also carries a rake or hay-gatherer, G. This frame is also provided with a transverse roller, H, near the lower end thereof, carrying at its ends pinions I I, which mesh with gear-wheels J J, mounted on the inner ends of the hubs of the drive or supporting wheels B B, and through the medium of which motion is communicated to said roller H and the usual endless carrier passing around said roller and a transverse roller, K, resting or journaled in the curved and inclined slots $d\ d$ formed in the upper sides of the side bars of the frame D, said bars being provided with a series of said slots $d$, whereby said roller K can be adjusted to regulate the tension of the endless carrier mounted on said rollers H K.

The inner or rear end of the frame C is secured in any desired manner to a wagon, so that the gathered hay may be discharged thereon.

The operation of my improved machine is obvious from the foregoing description, the hay being gathered by the rake G and carried by an endless carrier passing around the rollers H K to the wagon, said carrier being revolved through the medium of the pinions and gear-wheels I J from the drive or supporting wheels B B.

Having thus fully described my invention, what I claim as new, and desire to secure by Letters Patent, is—

The herein-described hay rake and loader, composed of the rectangular frames C D, adjustably connected together at their upper ends and centrally mounted on the transverse shaft A, the frame D being provided with a series of inclined curved journal-notches, $d$, adjustable roller K, transverse roller H, provided with pinions I I, the supporting-wheels F F, and the rake G, and the drive or supporting wheels B B, provided with the gear-wheels J J, the several parts constructed and relatively arranged to operate in the manner herein shown and described.

EDWIN SPENCER.

Witnesses:
HUGH E. MILLER,
I. P. HELVENSTON.